Nov. 1, 1927.  
G. H. E. DE RAM  
1,647,438  
CONNECTING ROD FOR THE SUSPENSION OF VEHICLES  
Filed Oct. 2, 1924  3 Sheets-Sheet 1
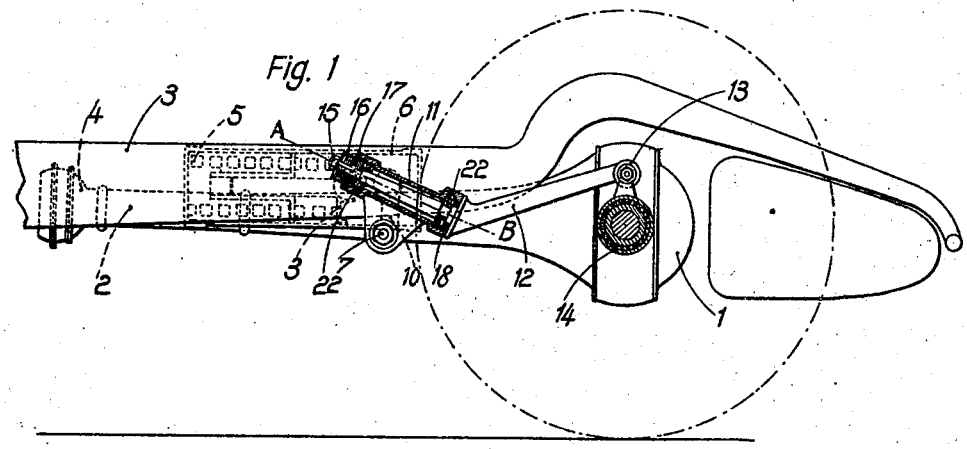
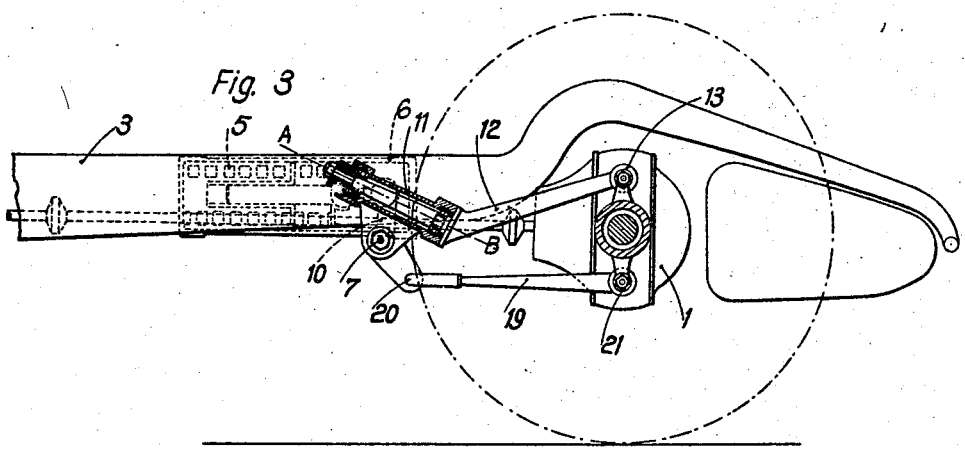
Inventor  
G. H. E. de Ram  
By Marks & Clerk  
Attys.

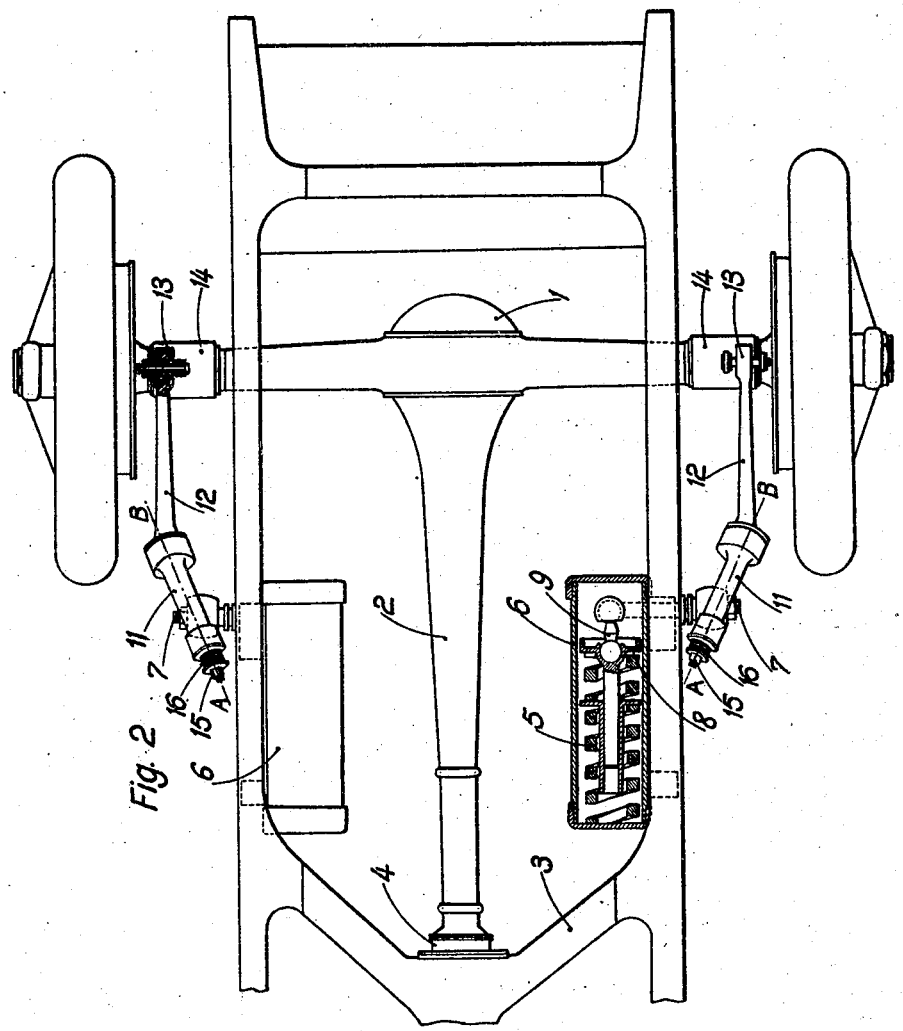

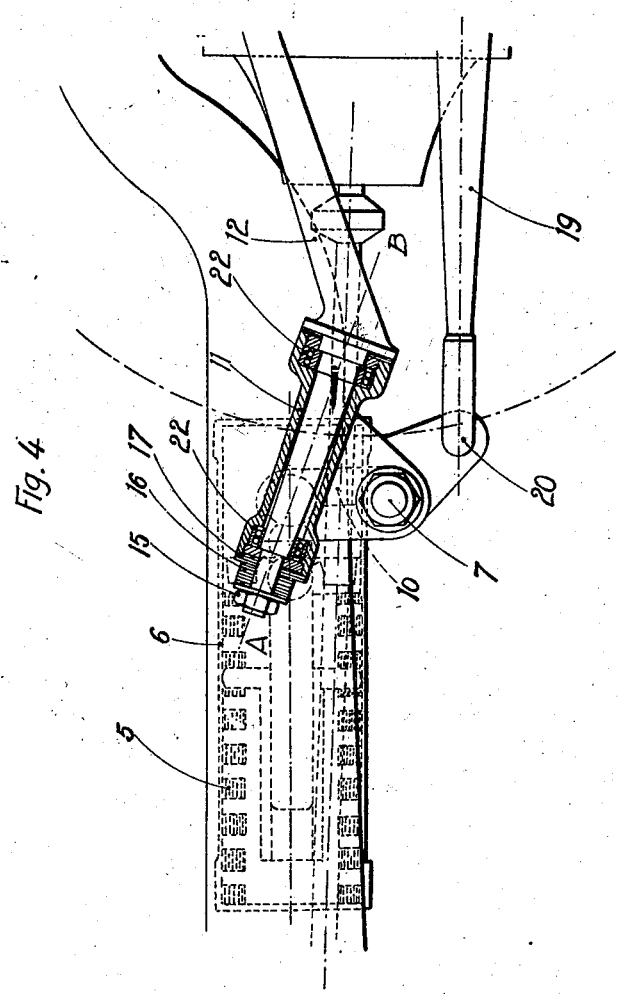

Patented Nov. 1, 1927.

1,647,438

UNITED STATES PATENT OFFICE.

GEORGES HENRI ERNEST DE RAM, OF BOULOGNE, FRANCE.

CONNECTING ROD FOR THE SUSPENSION OF VEHICLES.

Application filed October 2, 1924, Serial No. 741,207, and in France October 2, 1923.

The present invention relates to an arrangement for connecting mechanically an axle to the suspended frames of vehicles in general. The arrangements described are more particularly applicable to selfpropelled vehicles.

It is known that in order to isolate the carriage from certain oscillations, it is indispensable to allow a certain lateral displacement to the axles. It is also necessary to provide an elastic lateral pull-off to bring back the axle to its position of equilibrium. The lateral displacements of the axle must moreover be braked to a certain extent, in order that they may not affect prejudicially the good behaviour of the vehicle when travelling.

The connecting arrangement which constitutes the subject of the invention fulfils all these conditions. It is shown by way of example in the accompanying drawing, in which:

Figs. 1 and 2 show in elevation and plan respectively and partly in section one construction intended for a vehicle having a tubular back axle at 1, the longitudinal branch of which surrounds the Cardan shaft connecting the change-speed gear box to the crown wheel of the differential, and the same time acts as a stress connecting rod.

Fig. 3 shows in elevation a modification intended for a vehicle having a free Cardan shaft.

Fig. 4 is an enlarged detail view of the spring 5 and sleeve 11 shown in Fig. 1.

The same reference numerals relate to the same members in the several figures.

In Figs. 1 and 2 the axle is shown at 1; the stress is transmitted through the Cardan tube 2 jointed to the frame 3 by means of the ball and socket joint 4.

Resilient suspension is obtained by means of spiral springs 5, enclosed in cylinders 6 attached to the frame. These springs transmit their action to the shaft 7 through the piston 8, the short connecting rod 9 and the lever 10, keyed on the shaft 7. This method of suspension has however been selected merely by way of example. It is of a known type, and naturally might be replaced by any other, the subject of invention consisting essentially in the connection of the shaft 7 to the axle 1.

On the shaft 7 there is keyed a sleeve 11 in which there engages the tail of the suspension rod 12 connected to the axle by the shackle 14 and the ball and socket 13. The shackle 14 is jointed on the axle 1.

The suspension rod 12 is provided at its other end with the nut 15, a resilient member 16 (for example Belleville washers) and a friction washer 17. A second friction washer 18 is located at the back of the sleeve.

The lateral movements of the axle are converted by a slight rotation of the suspension rods 12 in the sleeve 11, a rotation which is facilitated if needful by the addition of ball bearings 22 for the tail of the rod 12. This rotation and consequently the lateral displacements of the axle are braked by the friction set up by the washers 16 and 18.

The axis A—B of the sleeve 11 and of the rod 12 may be given a fixed suitable oblique direction with respect to the longitudinal axis of the frame, the purpose of such oblique direction being to cause a forcible bringing back of the axle to its position of lateral equilibrium.

The shackles 14 are provided so as not to interfere with the oscillations of the rear axle about the ball and socket 4.

Fig. 3 shows the same method of connection applied to a rear axle with free Cardan shaft. In this case the shackles 14 are omitted. The connecting rods 12 are connected directly to the axle by ball and socket joints 13 and transmit the stress; shorter connecting rods 19 taking their point of support on the frame by means of ball and socket joints 20 and jointed to the rear axle by ball and socket joints 21, offer resistance to the driving torque and to braking movements.

It is to be clearly understood the constructional details above mentioned have been given only by way of example and that the rotation of the suspension rod, amongst other things, may be obtained by other means.

Claims:

1. In a motor vehicle having a frame member and a road wheel axle member, springs mounted on one of said members, arms engaging the springs, sleeves carried by said arms, links having their outer ends pivotally connected to one of said members and provided at their opposite ends with spindles rotatably mounted in said sleeves and means for checking free turning movement of the spindles in the sleeves.

2. In a motor vehicle, a frame and a road wheel axle, springs mounted on the frame, arms engaging the springs, sleeves fixed to said arms, spindles rotatably mounted in said sleeves, means for checking free rotation of the spindles in the sleeves, second arms rigidly connected to the spindles, and ball and socket joints connecting the outer ends of the second arms to the axle.

3. In a motor vehicle, a frame and a road wheel axle, springs mounted on the frame, arms engaging said springs, sleeves fixed to said arms, rotatable spindles arranged in the sleeves, means associated with the sleeves for preventing free rotation of the spindles in the sleeves, second arms integral with the spindles and extending away from said sleeves, and ball and socket joints connecting the outer ends of the second arms to the axle.

4. In a motor vehicle as claimed in claim 2, said sleeves converging toward each other and being inclined relatively to the horizontal.

In testimony whereof I hereunto affix my signature.

GEORGES HENRI ERNEST de RAM.